L. H. PERLMAN.
WHEEL.
APPLICATION FILED FEB. 23, 1917.
1,270,435. Patented June 25, 1918.
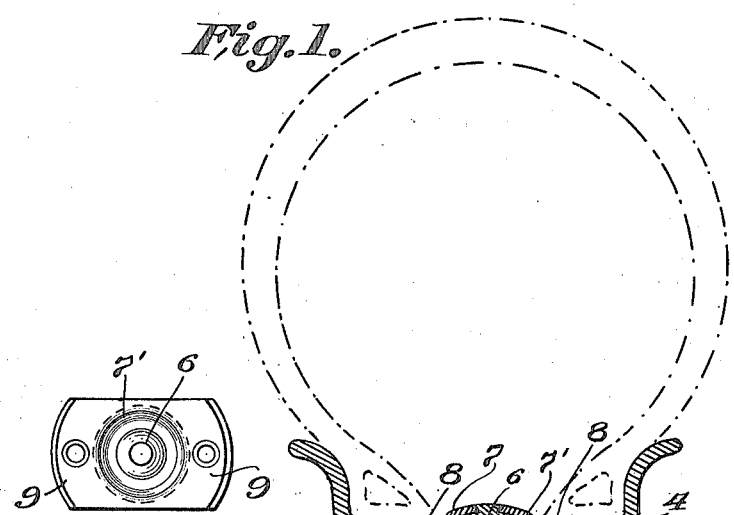
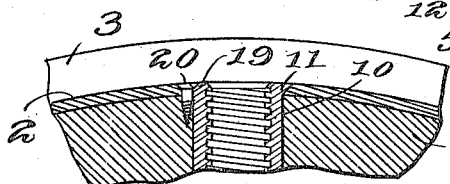
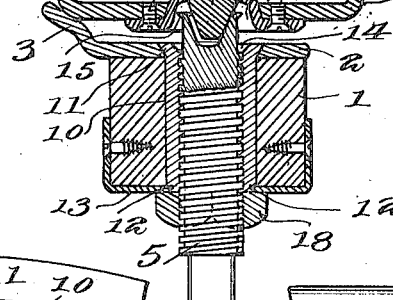
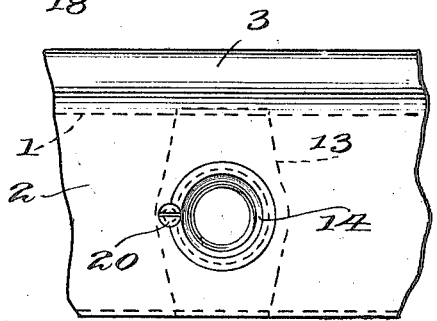
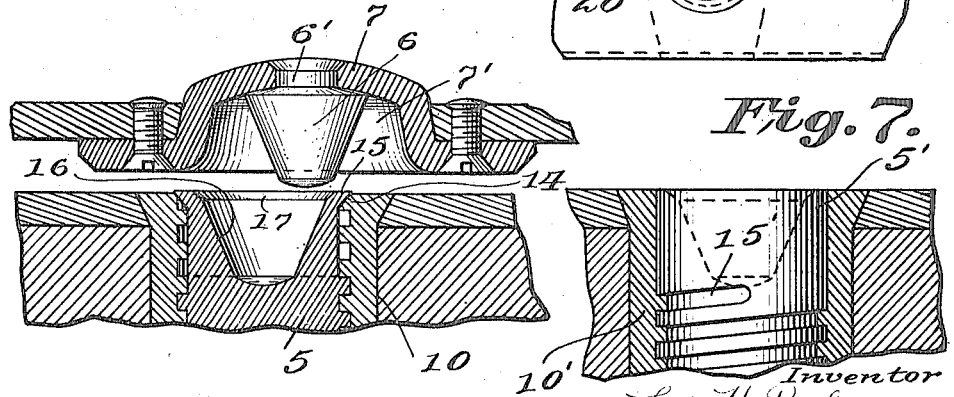
Witnesses
Inventor
Louis H. Perlman,
By his Attorney

UNITED STATES PATENT OFFICE.

LOUIS H. PERLMAN, OF NEW YORK, N. Y.

WHEEL.

1,270,435.   Specification of Letters Patent.   Patented June 25, 1918.

Application filed February 23, 1917. Serial No. 150,486.

*To all whom it may concern:*

Be it known that I, LOUIS H. PERLMAN, a citizen of the United States, residing at New York city, in the county of New York and State of New York, have invented certain new and useful Improvements in Wheels; and I do hereby declare the following to be a full, clear, and exact description of the invention, such as will enable others skilled in the art to which it appertains to make and use the same.

This invention relates to improvements in demountable rims for wheels of the type especially adapted for use on automobiles and like vehicles.

The object in view is the effective locking of a demountable rim in operative tensioned position on a wheel while in use by means designed to be quickly and easily released with both efficiency and precision.

With this and other more detailed objects in view the invention comprises certain novel constructions, combinations and arrangements of parts as subsequently specified and claimed.

In the accompanying drawing,—

Figure 1 is a section through a felly portion of a wheel body and demountable rim taken on a plane coincident with one of the rim locking devices.

Fig. 2 is an enlarged detail fragmentary section of the same parts taken on the same plane, the parts being seen in elevation.

Fig. 3 is an inverted plan view of the cone and its carrying plate detached.

Fig. 4 is an end elevation of the locking bolt.

Fig. 5 is a transverse axial section of a fragment of the wheel body, the locking bolt being omitted.

Fig. 6 is a plan view of the parts seen in Fig. 5.

Fig. 7 is a view similar to Fig. 2 of a modified embodiment.

Referring to the drawing by numerals, 1 indicates the usual wood felly and 2 the fixed rim of an ordinary wheel body, the fixed rim 2 having the usual stop flange 3 at its inner edge. A demountable rim 4 of the conventional type is arranged to removably surround the felly band 2 and to rest at its inner edge against the stop flange 3. At various points about the wheel body and demountable rim are arranged sets of locking elements for the demountable rim, the said sets being preferably spaced substantially uniformly about the wheel and varying in number according to the character of the wheel and the stresses to be resisted. For the average pleasure car five such sets will be found ample, and a less number will frequently suffice.

Each of the sets of locking devices for the demountable rim is of the form seen in the drawing and is made up of a bolt 5 and its coöperating parts on the wheel body and a cone 6 and its coöperating parts on the demountable rim. The cone 6 is a radially inwardly extending projection carried by a cap plate 7 which is detachably fixed to the rim 4. The method of attachment of the cap plate 7 may vary and the plate may be permanent fixed if desired, but I prefer to employ screws 8, 8, extending through the flanges of the plate 7 and engaging the rim 4 for detachably retaining the plate in place. The plate 7 is essentially a substantially circular cup-shaped structure having outstanding edge flanges 9. As clearly seen in Fig. 3 these flanges 9 are preferably not continuous but it is obvious that a continuous or substantially annular flange may be employed about the edge of the cap plate 7. The cone 6 is preferably made up of material provided with a shank 6' adapted to extend through a central aperture formed in the plate 7. The shank 6' is adapted to serve as a rivet and to have its outer end swaged over as clearly seen in Fig. 2 for firmly securing the cone 6 within the cap 7. The cone 6 may be otherwise fixed within the cap but the method just stated has been found to be both simple and efficient. The cones 6 with their shanks 6' may be turned on a lathe or otherwise formed as manufacturing and commercial conditions may dictate. The cone 6 and cap 7 are so proportioned with respect to each other that a space 7' is formed between the conical surface of the part 6 and the inner surface of the walls of the cap 7, this space being provided to accommodate the outer end portion of the bolt 5 as will be hereinafter more fully set forth. The cap 7 is preferably formed of flat sheet material pressed or otherwise stamped to produce the cup by which the major portion of the cone 6 is surrounded. Instead of being stamped, the cap plate 7 may, of course, be turned on a lathe or cast or otherwise formed as desired.

The bolt 5 is threaded through a sleeve 10 anchored in the wheel body after the manner set forth in my co-pending application Serial No. 105,693, filed June 24, 1916, as by having a flange 11 overhanging a portion of the material of the rim 2 at the outer end of the sleeve, and the inner end of the sleeve swaged at 12 over a wear plate 13 fixed to the felly 1. The outer end of the sleeve is formed with a beveled enlargement 14 leading to the threaded bore of the sleeve and the upper end of the bolt or threaded shaft 5 is formed with a beveled flange 15 corresponding in size and contour with the bevel 14 and adapted to overhang the same so that when the threaded shaft 5 is withdrawn, that is threaded radially inward, the flange 15 will seat upon the bevel 14 and resist further inward movement of the bolt or shaft 5 such resistance indicating to the operator that the bolt has been withdrawn a distance sufficient to enable the parts to clear. As will be hereinafter specified, the outer end of the bolt or shaft 5 is formed with a conical recess or pocket 16 shaped to conform with the shape of the cone 6 and adapted to receive the cone in use. At the outer end of the pocket 16 the material of the bolt 5 is beveled, as at 17, at a more abrupt angle than the inclined walls of pocket 16 for facilitating entrance of the tip of cone 6 into the pocket.

In operation, when the rim 4 is to be removed from the wheel, the parts being in the position seen in Fig. 1, the operator applies a wrench to the inner end of the shaft 5 and screws the same inward until the flange 15 resists further inward movement. This is a signal to the operator that the outer end of the shaft or bolt has passed inward beyond the plane of the tip of the cone 6, and indicates that the cone is clear to move across the end of the bolt. When all of the bolts have been thus withdrawn, the rim 4 is slid substantially axially off of the wheel body at that point most remote from the valve stem, and is then lifted away from the wheel body in the usual manner of removing a demountable rim. The rim is thus "rocked" off and a new rim "rocked" on. As soon as the new rim is brought to a position engaging the flange 3 the bolts 5 are threaded outward. Each has its inclined wall 17 or the wall of its pocket 16 engage the inclined wall of the respective cone 6 and as the bolt is threaded outward the inclined wall of the pocket 16 serves as a wedge coöperating with the cone 6 to thrust the rim axially into firm contact with the flange 3 while pressing the rim radially outward. The rim 4 is thus effectively locked and tensioned in its operative position. A lock nut 18, or other appropriate means for preventing release of the bolt may be employed as desired.

To avoid loosening of the parts by rotation of the sleeve 10, a notch 19 is formed in the flange 11 and an ordinary wood screw 20 is screwed into the felly 1 in position for having a portion of its head lie within the notch 19. Of course, a complementary notch and aperture is formed in the band 2 for accommodating the remaining portion of the head and the body of the screw 20. Ordinarily the sleeve 10 has a sufficiently tight fit to avoid loosening, but the presence of the screw 20 will effectively and absolutely insure against such release.

In Fig. 7 is shown a modified embodiment wherein the bolt 5' similar in all respects to bolt 5 is employed except that the bolt 5' is not provided with the overhanging flange 15 but in lieu thereof has its threads terminate at 5'' corresponding to the termination of the threads in the sleeve 10', the terminals of the two threads being located with respect to the sleeve and bolt in a manner to prevent withdrawing rotation of the bolt 5' to an extent further than that required for bringing the bolt to a position flush with the outer face of the felly band. In manipulating the bolt 5', when it has been withdrawn to the required extent, the terminal wall of the female thread on bolt 5' will engage the terminal wall of the make thread of sleeve 10' and thus effectively prevent further rotation of bolt 5' in the direction of withdrawal.

This application presents an invention differing only in the details named in the appended claims from the subject matter of my copending application Serial No. 121,833, filed September 23, 1916.

What I claim is:—

1. In a demountable rim structure, the combination with a rim base, of a cap plate set into said base and a rim lock receiving member formed separately from and fixed to said cap.

2. In a demountable rim structure, the combination with a rim base, of a cap plate set into said base and a rim lock receiving member formed separately from and fixed to said cap, the cap being stamped from sheet metal.

3. In a demountable rim structure, the combination with a rim base, of a cap plate set into said base and having a rim locking receiving member, the said cap plate being stamped from sheet material.

4. In a wheel of the class described, the combination with a wheel felly, of a bolt threaded through the felly in position for engaging and locking a demountable rim on the wheel, the outer end of the bolt being formed with an axially disposed substantially conical lock receiving recess and being formed with a flange disposed to overhang portions of the felly for limiting inward movement of the bolt.

In testimony whereof I affix my signature in presence of two witnesses.

LOUIS H. PERLMAN.

Witnesses:
I. B. LEIBSON,
EDGAR M. KITCHIN.